United States Patent [19]

Sheem

[11] 4,440,498
[45] Apr. 3, 1984

[54] OPTICAL FIBER GYROSCOPE WITH (3×3) DIRECTIONAL COUPLER

[75] Inventor: Sang K. Sheem, Richardson, Tex.

[73] Assignee: The United States of America as represented by the Secretary of the Navy, Washington, D.C.

[21] Appl. No.: 320,999

[22] Filed: Nov. 13, 1981

[51] Int. Cl.³ .................. G01C 19/64; G02B 5/14
[52] U.S. Cl. .................. 356/350; 350/96.15
[58] Field of Search ............ 356/350; 350/96.15

[56] References Cited

U.S. PATENT DOCUMENTS 3,102,953  9/1963  Wallace .................. 356/350
4,013,365  3/1977  Vali et al. ............... 356/350

FOREIGN PATENT DOCUMENTS 55-157701  12/1980  Japan .................. 350/96.15

OTHER PUBLICATIONS

Sheem et al., "Optical Fiber Gyroscope with (3×2) Guided-Wave Splitter," Third International Conference on Integrated Optics and Optical Fiber Communications, San Francisco, Ca., USA (Apr. 27–29, 1981), pp. 116–117.

*Primary Examiner*—Vincent P. McGraw
*Attorney, Agent, or Firm*—Robert F. Beers; William T. Ellis; Kenneth E. Walden

[57] ABSTRACT

A Sagnac rotation sensing interferometer disposed on a rotating platform for use as a gyrsocope comprising a closed optical light path and a beam splitter for splitting an input light beam into two beams directed to transverse the closed optical path in opposite directions wherein the beam splitter is composed of a directional coupler with three input ports and three output ports. The first of the three input ports receives optical input and the second and third of the input ports are disposed symmetrically with respect to the first input port. Optical output from two output ports corresponding to the second and third input ports are directed to both ends of the closed optical fiber light path. A gyroscope according to this arrangement provides light output from the beam splitter which operates automatically near quadrature without a nonreciprocal $\pi/2$ phase bias applied in the fiber loop as required in conventional optical fiber gyroscopes.

9 Claims, 6 Drawing Figures

OPTICAL FIBER GYROSCOPE WITH (3×3) DIRECTIONAL COUPLER

BACKGROUND OF THE INVENTION

It has long been known that Sagnac effect may be utilized to detect rotation rate of various objects. See references: e.g., Post review of Modern Physics, Vol. 39 p. 475 1967; and V. Vali, R. W. Shorthill and M. F. Berg, Applied Optics Vol. 15, p. 1099, 1977. Also, refer to U.S. Pat. Nos. 3,102,953, and 4,013,365 for disclosures relating to apparatus for measuring angular rotation. The Sagnac gyroscope has been developed vigorously, especially since low loss long length single mode optical fibers became available.

One of the technical difficulties in optical gyroscope technology stems from the fact that unless $\pi/2$ nonreciprocal phase bias scheme is utilized, the gyro sensitivity is at its minimum near zero rotation rate. And most of the gyro applications deal with measurement of near zero rotation rate. There are various ways of implementing the $\pi/2$ nonreciprocal phase bias in the optical fiber loop in order to overcome the problem. However, they add to the gyro system additional optical noise system complication, and device size and cost. The present invention provides an optical fiber gyroscope with a three fiber directional coupler for coupling light into opposite ends of a fiber loop to traverse the loop in mutually opposite directions and for receiving the light from opposite respective fiber ends and combining it in a manner whereby optical output is at quadrature or most sensitive to change at near zero rotation of the loop.

SUMMARY OF THE INVENTION

Accordingly, it is the purpose of the present invention to provide an optical fiber gyroscope that has near maximum sensitivity at a near zero rotation rate, and thus does not need the $\pi/2$ nonreciprocal phase bias.

This purpose is achieved by recognizing that all the known gyroscopes use beam splitters that have two input ports and two output ports. Specifically, the purpose of the present invention is achieved by using as the beam splitter a directional coupler (herein designated a (3×3) directional coupler) having three input ports (three ports on the input side) and three output ports. The first input port among the three input ports receives an optical input beam. The second and the third input ports are disposed symmetrically with respect to the first input port. Thus, the second and the third ports receive optical beams of the same magnitude and phase from the first input port through evanescent coupling therebetween. The beams from the second and third output ports are directed into the ends of an optical fiber which is arranged to define an optical gyrsocope loop. Since the second and third ports are symmetric and indistinguishable, the final gyro loop outputs back to the second and the third outputs are the same unless the gyro is in rotation. This means that the gyro sensitivity is near maximum at zero or near zero rotation rate. As a result, an optical gyroscope using a (3×3) directional coupler as a beam splitter does not need a $\pi/2$ phase bias in the gyro loop in order to maximize gyro sensitivity at very small rotation rates.

Additional advantage and features will become apparent as the subject invention becomes understood by reference to the following detailed description when considered in conjunction with the accompanying drawings.

DETAILED DESCRIPTION OF THE INVENTION

Figure 1:
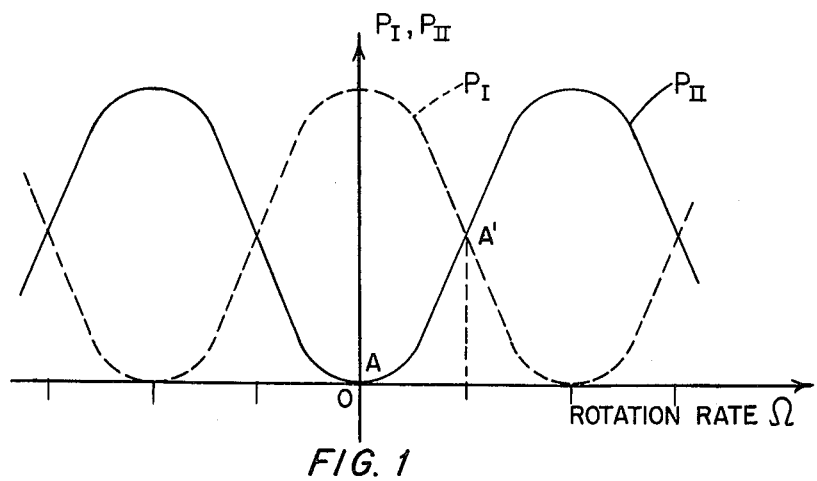
FIG. 1 shows the relationship between optical gyroscope output $P_I$ and $P_{II}$ relative to rotation rate in the conventional gyroscope without $\pi/2$ nonreciprocal phase bias and illustrates that gyro sensitivity $dP_I/d\Omega$ and $dP_{II}/d\Omega$ vanishes at $\Omega=0$.

First a background review will be made regarding the phase bias problem of the conventional optical gyroscope. FIG. 1 shows, for example, the relationship between gyro output $P_I$ and rotation rate $\Omega$. As seen, the gyro sensitivity being defined by $dP_I/d\Omega$ equal to zero at $\Omega=0$. The rate change to either side of $\Omega=0$ causes only minimal amplitude change along the output curve. Since many gyro applications involve the measurement of very small rotation rates. it is necessary to use so called nonreciprocal phase bias to move the initial ($\Omega=0$) operating point A' to A, as depicted in FIG. 1, for increased sensitivity.

Figure 2:
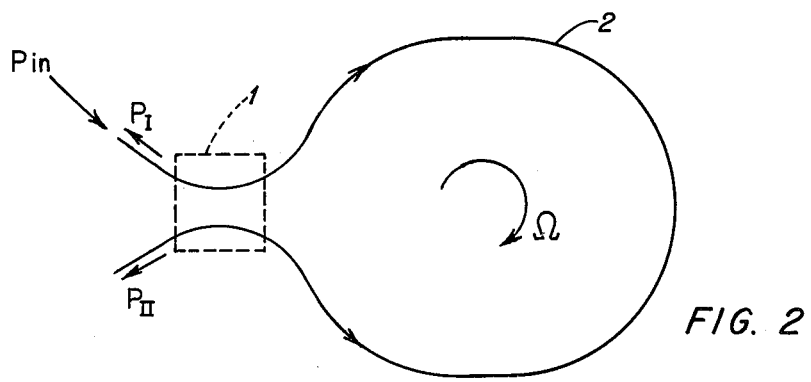
FIGS. 2 and 3 are schematic illustrations of conventional optical gyroscopes using two beam splitters, each with two inlets and two outlets.
Figure 3:
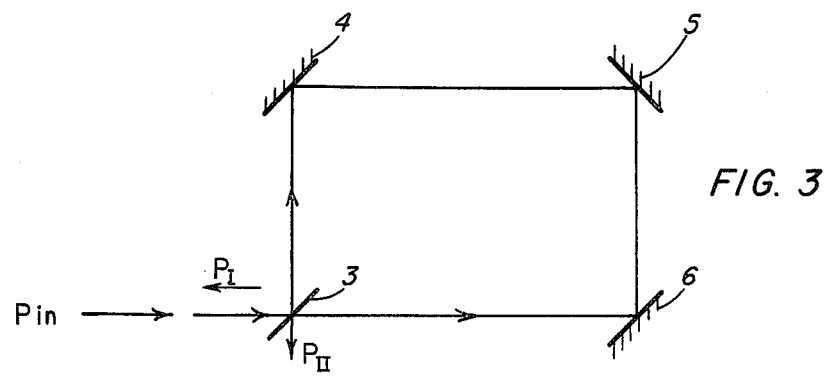

Such a problem occurs in the conventional optical gyroscope as shown, for example, in FIGS. 2 and 3. In Fig. 2, input beam $P_{in}$ is split into two by a directional coupler 1. The two split beams make round trips along the closed fiber loop 2, one propagating clockwise and the other propagating counter clockwise, and recombine at directional coupler 1. In FIG. 3 an equivalent optical gyroscope is shown in which bulk optics are used instead of the all-guided wave optical components as illustrated in FIG. 2. Input beam $P_{in}$ is split by a bulk beam splitter 3. The split beams are folded by mirrors 4, 5 and 6 to make round trips in opposite directions.

It is worthwhile to notice that the beam splitters 1 and 3 in FIGS. 2 and 3, respectively, have two inlets and two outlets. Thus, it is always possible to distinguish one inlet from the other inlet because one receives the input beam while the other does not.

Figure 4:
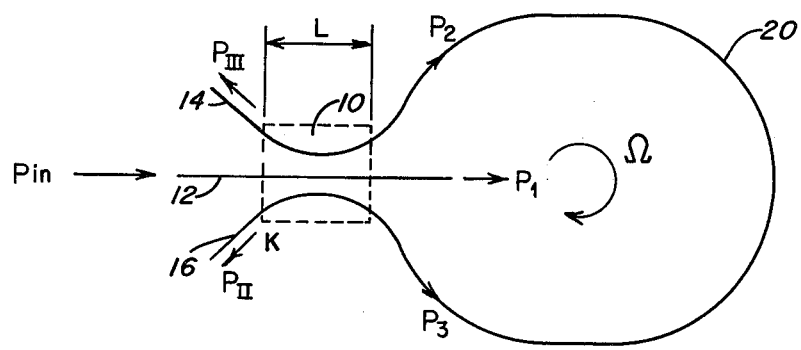
FIG. 4 is a schematic representation of the present invention wherein an optical gyroscope uses as the beam splitter a directional coupler with three inlets and three outlets, i.e. a (3×3) directional coupler.
Figure 5:
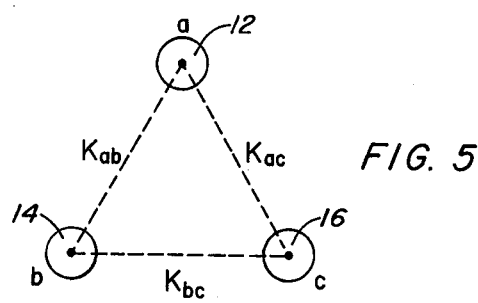
FIG. 5 is a cross-sectional illustration of optical coupling between three equispaced optical fibers as in the directional coupler of FIG. 4.

FIG. 4 is a schematic representation of the present invention in which a directional coupler 10 with three inlets and three outlets is used as the beam splitter. With respect to the center inlet waveguide 12, the two other waveguides 14 and 16 are indistinguishable. There is illustrated in FIG. 5 a typical cross-sectional view of optical fibers defining directional coupler 10 in FIG. 4. Three equidistant or equispaced fibers a, b and c are illustrated, in which the coupling coefficients $K_{ab}$ (between the fibers a and b) and $K_{ac}$ (between the fibers a and c) are same. Assuming a beam $P_{in}$ is launched into optical fiber a, for example, it will be coupled by its evanescent field equally into optical fibers b and c as illustrated b $K_{ab}$ and $K_{ac}$. Optical fibers a, b and c, which define waveguides, may be disposed parallel or mutually twisted about each other as they traverse some length L (Fig. 4) across directional coupler 10 sufficient to establish evanescent coupling. Light from optical fibers b and c may be coupled into respective ends of optical fiber loop 20. Light introduced into respective ends of loop 20 propagate therethrough in mutually opposite directions and emerge at opposite respective ends to enter optical fiber waveguides b and c, this time propagating in the reverse direction. Again, optical fibers b and c define waveguides of close proximity, as illustrated in FIG. 5, to allow mutual interference of the beams at directional coupler 10.

As shown in FIG. 4, directional coupler 10 comprises three optical waveguides, such as optical fibers, which lie in coextensive adjacency whereby laser light transported through waveguide 12 is equally coupled by evanescent coupling into equidistant waveguides 14 and 16. Waveguide 12 is relatively short. Waveguides 14 and 16 may also be of short lengths, in which case it is necessary to couple light from their ends into respective ends of the optical fiber forming loop 20. However, waveguides 14 and 16 may be integral extensions of the optical fiber waveguide defining loop 20. Beams returning from round trips through loop 20 are directed through lengths of waveguides 14 and 16 in close adjacency for mixing for mutual interference prior to separation as $P_{II}$ and $P_{III}$, as shown in FIG. 4. Thereafter, beam outputs $P_{II}$ and $P_{III}$ are directed from ends of respective waveguides onto detector means (not illustrated) where the outputs $P_{II}$ and $P_{III}$ are detected and compared to provide an indication of loop rotation. Waveguides 12, 14 and 16 may be fixedly carried in a substrate not illustrated to maintain their relative spacings from each other. When optical fibers define the waveguide, they may be disposed either parallel or mutually twisted in a substrate such as a suitable liquid or set epoxy. Otherwise, the waveguides may be diffused, for example, into a substrate at controlled locations and depths such that their equidistances are maintained as defined in FIG. 5.

Figure 6:
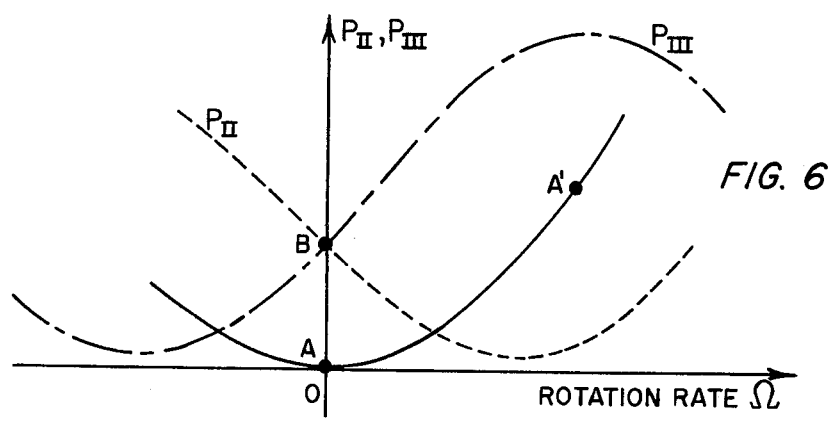
FIG. 6 shows the relationship between outputs $P_{II}$ (and $P_{III}$) of the gyroscope shown in FIG. 5 relative to rotation rate $\Omega$.

If the coupling coefficients $K_{ab}$ and $K_{ac}$ are same, $P_{II}$ and $P_{III}$ will be same if $\Omega=0$, since they are indistinguishable. This is shown in FIG. 6 in which the curves $P_{II}$, $P_{III}$ versus rotation rate are shown. While the sensitivity of $dP_I/d\Omega$ (or $dP_{II}/d\Omega$) is zero at $\Omega=0$ in FIG. 1, the sensitivity of $dP_{II}/d\Omega$ (or $dP_{III}/d\Omega$) is not zero at $\Omega=0$ in FIG. 6.

The mathematical analysis to derive the curves in FIG. 6 were published in the *Journal of Applied Physics* 52, (6), June 1981 in an article entitled "Optical Fiber Interferometers with (3×3) Directional Couplers; Analysis," and also in *Applied Physics Letters*, Vol. 37, p. 869 Nov. 15, 1980 entitled "Fiber-Optic Gyroscope with (3×3) Directional Coupler".

Directional couplers 1 and 10, as illustrated in FIGS. 2 and 4, respectively, employ evanescent field coupling between two or more optical fibers in adjacency. Such coupling is more fully described in U.S. Pat. No. 4,264,126 issued Apr. 28, 1981 to Sang K. Sheem. The couplers perform a beam splitting function and are used instead of the more conventional bulk-type partially reflective mirrors.

The outputs from a conventional optical fiber gyroscope are illustrated in both FIGS. 1 and 6 (solid line) without a $\pi/2$ phase bias in the optical fiber loop. When the gyroscope is in a stationary state ($\Omega=0$), its output intensity sits at the valley of the curve where sensitivity $dP/d\Omega$ is zero. This is illustrated by point A in FIGS. 1 and 6. Since the rotation rate to be detected by a gyroscope is usually small, the output variation at the valley position is minimal unless a nonreciprocal $\pi/2$ phase bias is purposely introduced between the two oppositely propagating waves to move the operating point up from point A to point A'. The present invention accomplishes this objective by using a (3×3) directional coupler 10 as the beam splitter which is illustrated in FIG. 4. In this figure, an optical beam $P_{in}$ from a laser (not illustrated) is launched into a port defined by the end of optical fiber 12, from which it is distributed to optical fiber 14 and 16 and among output ports $P_1$, $P_2$ and $P_3$. Beams $P_2$ and $P_3$ make round trips in opposite directions around loop 20 and reenter directional coupler 10 via fibers 14 and 16 to provide outputs $P_{II}$ and $P_{III}$. Optical fiber 12 is not available as an output. The directional coupler mixes the returning fields over the three waveguides (optical fibers 12, 14 and 16) through evanescent field coupling. As shown in FIGS. 6, output $P_{II}$ and output $P_{III}$ are near quadrature (point B) at $\Omega=0$. Comparison of $P_{II}$ and $P_{III}$ (dashed and dash-dotted lines) may be made in FIGS. 6 with the output (solid line) of the conventional gyroscopes known in the prior art. The advantage is obvious for at $\Omega=0$ the gyroscope inherently exhibits maximum sensitivity. A slight later change in causes an appreciable rise or fall along sensitivity curves $P_{II}$ and $P_{III}$.

The described (3×3) directional coupler of three input and three output ports operates automatically near maximum sensitivity at zero rotation. Therefore there is no need for a nonreciprocal phase bias in the fiber loop which would add noise and complexity to the system.

The coupling coefficients $K_{ab}$ and $K_{ac}$ in FIG. 5 may not be exactly same, but differ slightly. Then $P_{II}$ and $P_{III}$ in FIG. 6 will not be exactly same at $\Omega=0$; nonetheless, the sensitivities $dP_{II}/d\Omega$ and $dP_{III}/d\Omega$ will not be zero at $\Omega=0$.

While the invention has been particularly shown and described with reference to a specific embodiment, it will be understood by those skilled in the art that various changes in form and detail may be made thereto without departing from the spirit and scope of the invention which is limited only by the scope of the claims annexed hereto.

What is claimed is:

1. In an optical fiber gyroscope wherein light is introduced into an optical fiber waveguide formed in a loop for propagating therearound in mutually opposite directions to emerge therefrom for relative phase shift detection induced by rotation of the loop, the improvement residing in a directional coupler for carrying light to and from the loop comprising:

a first elongate optical waveguide adapted to have laser light launched into one end thereof and carry that light therethrough;

second and third optical waveguides including elongate portions thereof coextensively disposed with a length of the first optical waveguide at close distances therefrom and from each other whereby the laser light is coupled thereinto and directed into the loop for propagating therethrough in mutually opposite directions;

said second and third optical waveguides receiving the oppositel propagated light from the loop and mixing it for mutual interference by coupling from one to the other across the distance therebetween;

said second and third waveguides directing their respective mixed lights to detection means where their powers are compared;

whereby relative changes in light powers provides an indication of loop rotation.

2. The invention according to claim 1 wherein the waveguides are optical fibers.

3. The invention according to claim 1 wherein the waveguides are coextensively parallel over a common length thereof.

4. The invention according to claim 2 wherein the optical fibers are disposed parallel with one another over a common length thereof.

5. The invention according to claim 2 wherein the optical fiber waveguides are mutually twisted together over a common length thereof for allowing light coupling therebetween.

6. The invention according to claim 1 or 3 wherein the waveguides are disposed in a substrate.

7. The invention according to claim 1 or 3 wherein the second and third waveguides are optical fibers which are integral extensions of the optical fiber defining the loop.

8. The invention according to claim 2, 4 or 5 wherein the optical fibers defining the second and third waveguides are integral extensions of the optical fiber forming the loop.

9. An optical gyroscope for detecting rotation about an axis comprising:

a length of optical fiber waveguide wound in cylindrical form about an axis to define a loop;

a first optical waveguide adapted to have laser light launched into one end thereof for traveling therethrough toward its other end;

second and third optical waveguides including portions coextensively disposed in close equispacing with a length of the first optical waveguide for coupling laser light equally therefrom;

said second and third optical waveguides introducing light into opposite end portions of the optical fiber loop for propagating therearound in mutually opposite directions;

said second and third optical waveguides receiving the light after propagation around the loop and mixing the light for mutual interference by coupling from one to the other across said close equispacing therebetween and directing their respectively mixed lights to detection means where their powers are compared;

whereby relative changes in light powers induced by changing optical path lengths in the loop provides an indication of loop rotation.

* * * * *